United States Patent
Marmo

(10) Patent No.: US 7,816,455 B2
(45) Date of Patent: Oct. 19, 2010

(54) HYDROGEL CONTACT LENSES AND PACKAGE SYSTEMS AND PRODUCTION METHODS FOR SAME

(75) Inventor: J. Christopher Marmo, Danville, CA (US)

(73) Assignee: CooperVision International Holding Company, LP, St. Michael (BB)

( * ) Notice: Subject to any disclaimer, the term of this patent is extended or adjusted under 35 U.S.C. 154(b) by 0 days.

(21) Appl. No.: 11/669,353

(22) Filed: Jan. 31, 2007

(65) Prior Publication Data

US 2007/0119720 A1 May 31, 2007

Related U.S. Application Data

(63) Continuation of application No. 10/811,690, filed on Mar. 29, 2004.

(60) Provisional application No. 60/465,090, filed on Apr. 24, 2003.

(51) Int. Cl.
C08L 39/04 (2006.01)
C08L 35/00 (2006.01)
C08L 33/14 (2006.01)
C08L 7/04 (2006.01)

(52) U.S. Cl. ............... 525/203; 351/160 R; 351/160 H; 525/217; 525/218; 525/223

(58) Field of Classification Search ............. 206/5.1, 206/205, 207, 210; 351/160 R, 160 H; 525/203, 525/217, 218, 223
See application file for complete search history.

(56) References Cited

U.S. PATENT DOCUMENTS

| | | | |
|---|---|---|---|
| 3,220,960 A | 11/1965 | Wichterle et al. | |
| 3,954,644 A | 5/1976 | Krezanoski et al. | |
| 4,123,408 A | 10/1978 | Gordon | |
| 4,208,364 A | 6/1980 | Shepherd | |
| 4,347,198 A | 8/1982 | Ohkada et al. | |
| 4,460,573 A | 7/1984 | Huth et al. | |
| 4,462,665 A | 7/1984 | Shah | |
| 4,495,313 A | 1/1985 | Larsen | |
| 4,565,348 A | 1/1986 | Larsen | |
| 4,680,336 A | 7/1987 | Larsen et al. | |
| 4,691,820 A * | 9/1987 | Martinez | 206/205 |
| 4,889,664 A | 12/1989 | Kindt-Larsen et al. | |
| 5,039,459 A | 8/1991 | Kindt-Larsen et al. | |
| 5,159,360 A | 10/1992 | Stoy et al. | |
| 5,338,480 A | 8/1994 | Dziabo et al. | |
| 5,704,468 A * | 1/1998 | Lust et al. | 206/5.1 |
| 5,882,687 A | 3/1999 | Park et al. | |
| 6,008,170 A | 12/1999 | Tanaka et al. | |
| 6,029,808 A * | 2/2000 | Peck et al. | 206/210 |
| 6,082,533 A * | 7/2000 | Smith et al. | 206/210 |
| 6,309,723 B1 | 10/2001 | Ding et al. | |
| 6,331,578 B1 | 12/2001 | Turner et al. | |
| RE37,558 E * | 2/2002 | Abrams et al. | 206/5.1 |
| 6,440,366 B1 | 8/2002 | Salpekar et al. | |
| 6,531,432 B2 | 3/2003 | Molock et al. | |
| 2001/0044482 A1 | 11/2001 | Hu et al. | |

FOREIGN PATENT DOCUMENTS

| | | |
|---|---|---|
| WO | WO 98/55155 | 12/1998 |
| WO | WO 03/066714 A1 | 8/2003 |
| WO | WO 03/077792 A2 | 9/2003 |

OTHER PUBLICATIONS

PCT International Search Report dated Aug. 6, 2004 from corresponding PCT Application No. PCT/US04/09482 filed Mar. 29, 2004 and PCT International Search Report mailed Sep. 9, 2004 (2 pages).
PCT Written Opinion of the International Searching Authority mailed Sep. 9, 2004 from corresponding PCT Application PCT/US04/09482 filed Mar. 29, 2004 (5 pages).
Supplementary European Search Report dated Jul. 21, 2006 from corresponding EP Application No. EP 04 76 0220 and Supplementary European Search Report mailed Jul. 31, 2006 (3 pages).

* cited by examiner

*Primary Examiner*—David T Fidei
(74) *Attorney, Agent, or Firm*—Klein, O'Neill & Singh, LLP

(57) ABSTRACT

Contact lenses ready for use in an eye are provided including a contact lens body containing a hydrophilic polymeric component and a water soluble polymer component. Such contact lenses, which preferably are wet cast molded, are particularly useful as disposable or single use lenses. New contact lens packaging systems and production methods are also provided.

11 Claims, 1 Drawing Sheet

HYDROGEL CONTACT LENSES AND PACKAGE SYSTEMS AND PRODUCTION METHODS FOR SAME

CROSS-REFERENCE TO RELATED APPLICATIONS

This application is a continuation of application Ser. No. 10/811,690, filed Mar. 29, 2004, which claims the benefit of U.S. provisional Application No. 60/465,090, filed Apr. 24, 2003, the contents of which in their entireties are hereby incorporated by reference.

FIELD

The present invention relates to hydrogel-containing contact lenses, packaging systems including same and methods of producing same. More particularly the invention relates to hydrogel-containing contact lenses, for example, disposable contact lenses, including water soluble polymer components, and packaging systems for use with same and methods of producing same.

BACKGROUND

In the recent past, a method for producing hydrogel-containing contact lenses has been developed which is more economical than either lathe cutting or spin casting, and provides better control over the final shape of the hydrated lens. This method involves direct molding of a monomer mixture wherein said mixture is dissolved in a non-aqueous, displaceable solvent. The mixture is placed in a mold having the precise shape of the final desired hydrogel (i.e., water-swollen) lens, and the monomer/solvent mixture is subjected to conditions whereby the monomer(s) polymerize, to thereby produce a polymer/solvent mixture in the shape of the final desired hydrogel lens.

After the polymerization is complete, the solvent is displaced with water to produce a hydrated lens whose final size and shape are quite similar to the size and shape of the original molded polymer/solvent article.

Such direct molding of hydrogel contact lenses is disclosed in Larsen, U.S. Pat. No. 4,495,313 and in Larsen et al., U.S. Pat. Nos. 4,680,336, 4,889,664 and 5,039,459. In addition, other patents to be considered include Larson U.S. Pat. No. 4,565,348; Okkada et al U.S. Pat. No. 4,347,198; Shepherd U.S. Pat. No. 4,208,364; Mueller et al EP-A-0493,320A2; and Wichterle et al U.S. Pat. No. RE 27,401 (U.S. Pat. No. 3,220,960). The disclosure of each of these patents is incorporated in its entirety herein by reference.

It would be advantageous to provide new and beneficial hydrogel-containing contact lenses, packaging systems for such lenses and methods of producing such contact lenses.

SUMMARY

New hydrogel-containing contact lenses, packaging systems for use with such lenses and methods of producing such lenses have been discovered. The present hydrogel-containing lenses take advantage of the economies and shape control benefits of direct molding of hydrogel-containing contact lenses. In addition, by properly selecting the diluent or material included in the mold during lens formation, in particular by employing one or more water soluble polymer components, such diluent or material may remain within the lens ready for use in an eye. Thus, the present methods of making hydrogel-containing contact lenses are even less complex and more economical, for example, by eliminating the solvent displacing step, relative to prior art direct molding processes discussed elsewhere herein. The present packaging systems advantageously maintain the diluent or material in the contact lenses prior to use in an eye. In addition, the hydrogel-containing lenses advantageously have increased modulus or strength when first placed in an eye. Over time, for example, over a one day use period, the diluent or material is removed from the lens and replaced by water or tear fluid in the eye. When the lens is removed from the eye, it has less strength and provides an indication to the wearer that the lens should be disposed of and replaced. In addition, should the wearer use the lens again, the lens would be less comfortable to wear, for example, due to the loss of the diluent or material. This reduced comfort feature provides an indication to the wearer that the lens should be disposed of and replaced. The present lenses are particularly advantageous when provided as disposable lenses, for example, lenses suitable or structured for one time usage.

In one broad aspect, the present invention is directed to contact lenses which comprise contact lens bodies. The contact lens bodies comprise a hydrophilic polymeric material and a water soluble polymer component (WSPC). Such contact lens bodies are ready for use in an eye. In one embodiment, the WSPC is in intimate admixture with the hydrophilic polymeric material.

In a very useful embodiment, the WSPC is derived from a diluent material used during polymerization of the hydrophilic polymeric material. The WSPC advantageously is derived from a diluent material, for example, is at least a portion of the diluent material, used during solution polymerization of a hydrophilic polymeric material.

In one embodiment, the contact lens body is produced using wet cast molding.

As noted above, the present contact lenses advantageously are structured to be disposed of after a single use in the eye.

The present contact lens bodies including the WSPCs preferably have increased modulus relative to identical lens bodies in which the WSPC is replaced with water.

The WSPC advantageously is physically immobilized by the hydrophilic polymeric material in the present contact lens bodies. For example, the WSPC and the hydrophilic polymeric material may form an interpenetrating network or a pseudo interpenetrating network, preferably a pseudo interpenetrating network, in the lens body.

The present contact lens bodies preferably are configured or structured so that at least a portion of the WSPC leaves or is removed from the contact lens body during use of the contact lens body in an eye.

The hydrophilic polymeric material preferably is obtained by polymerization of at least one monomeric component, for example, by the polymerization of at least one hydrophilic monomeric component and at least one cross-linking monomeric component.

The hydrophilic monomeric component may be selected from any suitable such component. In a very useful embodiment, the hydrophilic monomeric component is selected from hydroxyalkyl acrylates, hydroxyalkyl methacrylates, N-vinyl pyrrolidone, acrylamides, vinyl alcohol, hydrophilic polyurethane precursors, glycerol acrylates, glycerol methacrylates, acrylates, methacrylates, substituted counterparts thereof and the like and mixtures thereof.

As used herein, the term "substituted counterparts thereof" refers to entities, e.g., compounds, which include one or more substituents and are effective to function in the present invention substantially like the unsubstituted entities, for example, the compounds listed herein.

Any suitable WSPC may be employed provided that it is effective in the present contact lenses, as described herein.

In one embodiment, the monomeric components from which the WSPCs are derived, for example, at least one ethylenically unsaturated hydrophilic monomeric component, are polymerizable to form linear or branched chain water soluble polymers or copolymers.

Hydrophilic monomeric components suitable for production of the WSPCs include, but are not limited to, hydrophilic vinylic monomers, such as vinyl ($C_4$-$C_{45}$)alkyl ethers, vinyl ($C_7$-$C_{49}$) alkenoic acids and the like and mixtures thereof; hydroxy substituted ($C_5$-$C_{45}$) alkyl, alkoxy-alkyl and poly-alkoxy-alkyl and mono- or bi-cycloaliphatic fumarates, maleates, acrylates, methacrylates, acrylamides and methacrylamides, and the like and mixtures thereof; acrylic acid, methacrylic acid, the corresponding amino or mono- and di-(lower alkyl)amino substituted acrylic monomers and the like and mixtures thereof; and vinyl-lactams and the like and mixtures thereof. Typical monomers include, but are not limited to, 2-hydroxyethyl, 2-hydroxypropyl, and 3-hydroxypropyl acrylates and methacrylates; N-vinylpyrrolidone; N,N-dimethylaminoethyl methacrylate; methoxyethyl-, ethoxyethyl, methoxy-ethoxyethyl and ethoxy-ethoxyethyl acrylates and methacrylates; (meth)acrylamides like N,N-dimethyl, N,N-diethyl, 2-hydroxyethyl-, 2-hydroxypropyl-, and 3-hydroxypropyl acrylamides and methacrylamides; vinyl sulfonic acid; styrene sulfonic acid; 2-methacrylamide-2-methyl propane-sulfonic acid and the like and mixtures thereof.

In one embodiment, the WSPC preferably includes units derived from one or more of acrylic acid, hydrophilic derivatives of acrylic acid, methacrylic acid, hydrophilic derivatives of methacrylic acid, cationic/anionic pairs of monomeric components, cationic monomeric components, anionic monomeric components, nonionic monomeric components, hydrophilic vinylic monomeric components, salts thereof and mixtures thereof.

In one very useful embodiment, the WSPC is selected from polyalkylene glycols, for example, polyethylene glycols, polypropylene glycols and the like, polyvinyl pyrrolidone, polymethacrylic acid, polyvinyl alcohol, and the like and mixtures thereof.

In another broad aspect of the present invention, packaging systems are provided which comprise a contact lens ready for use in an eye, a liquid medium, and a container holding the contact lens and the liquid medium. The contact lens comprises a contact lens body including a hydrophilic polymeric material and a WSPC, as described elsewhere herein. The liquid medium, preferably an aqueous liquid medium, comprises an amount of the WSPC in addition to that present in the contact lens body.

The liquid medium preferably includes the WSPC prior to the liquid medium being placed in the container, for example, in contact, with the contact lens.

Advantageously, the container is sealed, for example, using any suitable conventional container seal assembly, such as a conventional container seal assembly, and preferably sterilized to protect, preserve and maintain sterilized the contact lens and the liquid medium during shipment and storage.

In a further broad aspect of the present invention, methods for producing contact lenses are provided. Such methods comprise polymerizing at least one hydrophilic monomeric component in the presence of a WSPC to form a contact lens body comprising a hydrophilic polymeric material and the WSPC. Advantageously, an effective amount of at least one cross-linking monomeric component is present during the polymerizing step. The contact lens body is placed in a packaging container, preferably in a packaging system as described elsewhere herein.

Advantageously the polymerizing step is a solution polymerizing step. The WSPC preferably is included in a diluent used during the polymerizing step. The polymerizing step preferably occurs in a contact lens mold, for example, a conventional contact lens mold, such as a conventional thermoplastic contact lens mold.

In one very useful embodiment, a liquid medium, preferably an aqueous liquid medium, is also placed in the packaging container. This liquid medium preferably includes an amount of the WSPC in addition to that present in the contact lens body. The WSPC and the liquid medium preferably are ophthalmically acceptable.

In addition, the present methods preferably further comprise sealing the container with a contact lens body, and preferably the liquid medium, included therein.

Each and every feature described herein, and each and every combination of two or more of such features, is included within the scope of the present invention provided that the features included in such a combination are not mutually inconsistent.

These and other aspects of the present invention are set forth in the following detailed description, examples and claims, particularly when considered in conjunction with the accompanying drawings in which like parts bear like reference numerals.

DETAILED DESCRIPTION

Figure 1:
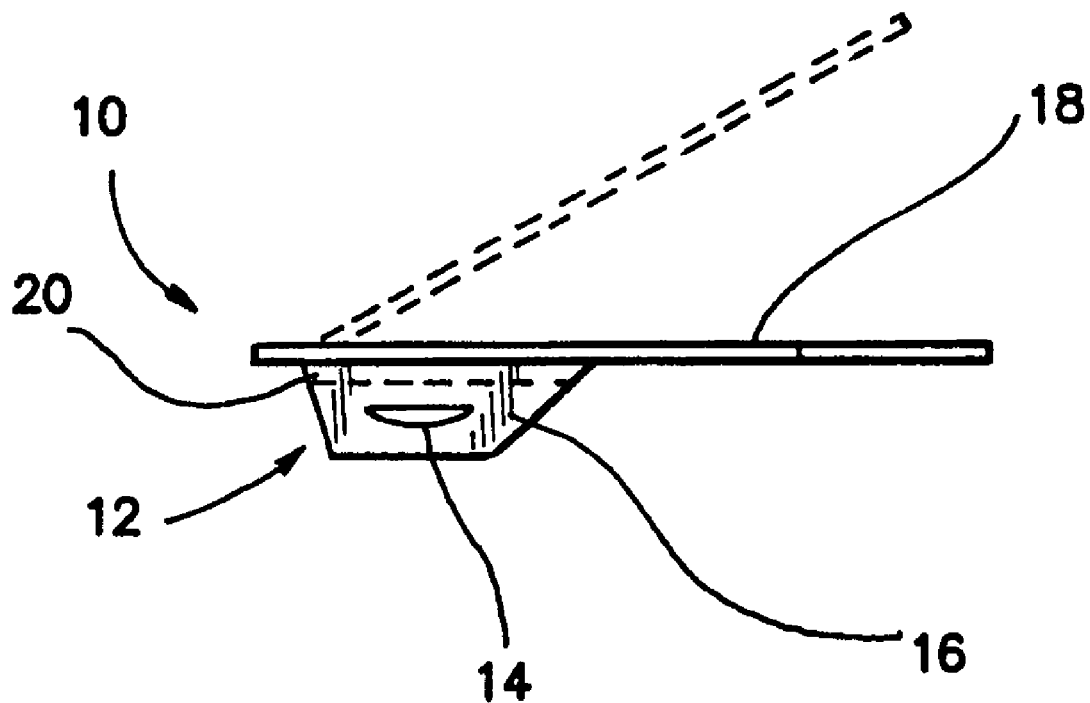
FIG. 1 is a schematic illustration of a packaging system in accordance with the present invention.

The present contact lenses comprise a contact lens body comprising a hydrophilic polymeric material and a WSPC, preferably an effective amount of the WSPC, for example, to increase the modulus or strength of the contact lens and/or to provide enhanced lubrication to the eye wearing the contact lens and/or to increase the comfort to the lens wearer of wearing the contact lens. Such benefits, e.g., increases and/or enhancements, are relative to an identical contact lens without the WSPC.

The hydrophilic polymeric materials useful in the present contact lenses may be selected from any suitable such materials. Preferably, such hydrophilic polymeric materials are such as to take on or absorb sufficient water so as to expand or swell. Such water-swellable materials are often referred to as hydrogels. A number of hydrophilic polymeric materials are conventionally used in contact lenses, and such conventionally used materials may be employed in the present contact lenses. Specific examples, without limitation, of useful hydrophilic polymeric materials are identified elsewhere herein.

An important feature of the present invention is the inclusion of WSPCs in the present contact lenses.

The WSPCs useful in the present invention may be chosen from any suitable such components. The presently useful WSPCs advantageously are ophthalmically acceptable and substantially not cytotoxic.

In a very useful embodiment, the WSPC is effective to provide at least one benefit to the contact lens and/or to the wearing of the contact lens and/or to the wearer of the contact lens. For example, the WSPC advantageously is present in an amount effective to increase the modulus or strength of the contact lens relative to an identical contact lens in which the WSPC is replaced by water. The WSPC may be selected, and present in the contact lens in an amount, so as to be effective as a lubricant or lubricity agent as the WSPC dissolves into the tear fluid while the contact lens is in use in an eye. Thus, the lens wearer's eye, for example, cornea and/or eyelids, is more effectively lubricated when wearing the present contact lenses, which enhances the comfort of wearing the lenses, relative to an identical contact lens in which the WSPC is replaced by water.

The WSPC may be selected to have substantially no detrimental effect on the optical clarity and/or optical power of the contact lens while in use.

Specific examples, without limitation, of useful WSPCs are identified elsewhere herein. The WSPC may be included in the present contact lenses in any suitable amount effective to provide the desired result.

One very useful class of WSPCs include polyethylene glycols. Polyethylene glycols are compounds that can be represented by the following formula:

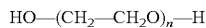

wherein n represents a number such that the molecular weight of the polyethylene glycol is within the range of from about 300 to about 10,000 and preferably from about 400 to about 2000 or about 5000. Such polyethylene glycols are commercially available products.

The WSPCs employed are ultimately water-displaceable. That is, after placing the contact lens including the hydrophilic polymeric material and the WSPC in the eye, the WSPC is ultimately at least partially, and even substantially completely, replaced with water in the eye.

However, it is advantageous to provide the WSPCs in the present contact lenses so that the hydrophilic polymeric material physically immobilizes the WSPC, at least to a limited extent. For example, the hydrophilic polymeric material may immobilize the WSPC in the contact lens sufficiently so that the WSPC is replaced by water substantially only after the lens is placed in an eye. In one useful embodiment, the WSPC is present in the present contact lenses in an interpenetrating network or pseudo penetrating network with the hydrophilic polymeric material, for example, to provide the desired degree of physical immobilization of the WSPC.

The replacement, for example, controlled replacement, of the WSPC by water in the eye, can allow the WSPC, in the eye, to provide added lubrication and comfort to the lens wearer. In addition, the removal of the WSPC from the contact lens in the eye may reduce the modulus or strength of the lens. Thus, after the lens wearer removes the WSPC-depleted lens from his/her eye, the lens will have different strength properties than before it was placed in the eye. These different properties provide an indication to the wearer that the lens is to be disposed of, rather than to be reused. In other words, the replacement of the WSPC in the contact lens with water in the eye, advantageously facilitates lens wearer compliance with proper usage of disposable contact lenses. The present lenses preferably are structured to be disposed of after a single use in the eye.

Mixtures of two or more WSPCs may be included in a single contact lens in accordance with the present invention.

The hydrophilic polymeric material employed in the present contact lenses may be derived from any suitable monomer or mixture of monomers. In one embodiment, a monomer mixture used which contains a major proportion of at least one hydrophilic monomer such as 2-hydroxyethyl methacrylate ("HEMA") as the major component, one or more cross-linking monomers, and optionally small amounts of other monomers such as methacrylic acid. HEMA is one preferred hydrophilic monomer. Other hydrophilic monomers that can be employed include, without limitation, 2-hydroxyethyl acrylate, 2-hydroxypropyl methacrylate, 2-hydroxypropyl acrylate, 3-hydroxypropyl methacrylate, N-vinyl pyrrolidone, glycerol mono-methacrylate, glycerol mono-acrylate, and the like and mixtures thereof.

The cross-linking monomers that can be employed, either singly or in combination, include, without limitation, ethylene glycol dimethacrylate ("EGDMA"), trimethylolpropane trimethacrylate ("TMPTMA"), glycerol trimethacrylate, polyethylene glycol dimethacrylate (wherein the polyethylene glycol has a molecular weight up to, for example, about 5000), other polyacrylate and polymethacrylate esters, endcapped polyoxyethylene polyols containing two or more terminal methacrylate moieties and the like and mixtures thereof. The cross-linking monomer is used in the usual amounts, e.g., from about 0.01% or less to about 0.5% or more, by weight of the reactive monomer mixture. The cross-linking monomer can be a hydrophilic monomer.

Other monomers that can be used include methacrylic acid, which is used to influence the amount of water that the hydrophilic polymeric material absorbs at equilibrium. Methacrylic acid is usually employed in amounts of from about 0.2 to about 8 parts, by weight, per 100 parts of hydrophilic monomer. Other monomers that can be present in the polymerization mixture include methoxyethyl methacrylate, acrylic acid, ultra-violet absorbing monomers, and the like and mixtures thereof.

A polymerization catalyst is included in the monomer mixture. The polymerization catalyst can be a compound such as lauroyl peroxide, benzoyl peroxide, isopropyl percarbonate, azobisiso-butyronitrile, and the like and mixtures thereof, that generates free radicals at moderately elevated temperatures, or the polymerization catalyst can be a photoinitiator system such as an aromatic α-hydroxy ketone or a tertiary amine plus a diketone. Illustrative examples of photoinitiator systems are 2-hydroxy-2-methyl-1-phenyl-propan-1-one and a combination of camphorquinone and ethyl 4-(N,N-dimethyl-amino)benzoate. The catalyst is used in the polymerization reaction mixture in catalytically effective amounts, e.g., from about 0.1 to about 2 parts by weight per 100 parts of hydrophilic monomer.

The presently useful WSPCs preferably are included in the contact lenses during polymerization, for example, solution polymerization, to produce the hydrophilic polymeric material. In a particularly useful embodiment, the WSPC in the contact lens is derived from a diluent material used during such polymerization of the hydrophilic polymeric material.

In another broad aspect, the present invention is directed to methods of producing contact lenses. Such methods comprise polymerizing, preferably solution polymerizing at least one hydrophilic monomeric component in the presence of a WSPC to form a contact lens body comprising a hydrophilic polymeric material and the WSPC. The WSPC preferably is included in a diluent used during the polymerizing step. The contact lens body is ready for use in the eye and is advantageously placed in a packaging container, for example, for shipment and/or storage.

The polymerizing step advantageously occurs in a contact lens mold, for example, a conventional contact lens mold. The polymerizing step may take place in a manner substantially similar or analogous to the corresponding step in the conventional wet cast molding process for making hydrophilic contact lenses. The polymerization reaction conditions useful in the present methods are substantially the same as those used in conventional wet cast molding processes for producing hydrophilic contact lenses and, therefore, are not detailed herein.

The resulting contact lens body preferably includes an interpenetrating network or a pseudo interpenetrating network of the hydrophilic polymeric material and the WSPC. One important feature of the present methods is that the WSPC is not replaced, for example, with water, prior to the contact lens being placed into a packaging container or into an eye. As described elsewhere herein, the WSPC in the contact lens in the eye produces one or more benefits.

In a further broad aspect, the present invention is directed to package systems for contact lenses, for example, the present contact lenses. Such package systems comprise a contact lens ready for use in an eye, a liquid medium, preferably an aqueous liquid medium, and a container holding the contact lens and the liquid medium. The contact lens comprises a contact lens body comprising a hydrophilic polymeric material and a WSPC, as described elsewhere herein.

The liquid medium comprises an amount of the WSPC in addition to the WSPC present in the contact lens body. Although the WSPC in the liquid medium need not be the same as the WSPC in the lens body, preferably it is substantially the same WSPC as that present in the lens body. Advantageously, the liquid medium includes the WSPC prior to the liquid medium being placed in contact with the lens body. The presence of the WSPC in the liquid medium preferably is effective to inhibit migration of the WSPC in the lens body from the lens body. Thus, the amount or concentration of the WSPC in the lens body is substantially maintained in the packaging system, and is available for providing one or more benefits, as described elsewhere herein, after the contact lens is placed in an eye. The concentration of the WSPC in the liquid medium may be about equal to, or somewhat more or less than, that present in the lens body prior to the lens body being placed in contact with the liquid medium. The liquid medium, other than the WSPC, may have a composition substantially similar or analogous to liquid medium used in package systems for conventional hydrophilic contact lenses. Saline solutions, buffered saline solutions, other aqueous solutions and the like, together with the WSPC, may be employed.

The container advantageously is sealed, after placing the contact lens and liquid medium in the container, to preserve these components during shipment and storage. The container and seal may be substantially similar or analogous to a conventional blister pack which is used for packaging conventional hydrophilic contact lenses.

Referring now to FIG. 1, a package system in accordance with the present invention is shown at 10. Package system 10 includes a container 12, a contact lens 14, including a contact lens body including a hydrophilic polymeric material and a WSPC, a liquid medium 16, comprising an aqueous saline solution containing a separate amount of the WSPC present in the contact lens, and a removable seal 18.

The container 12 and seal 18 are similar to the container and seal used in a conventional blister pack used with conventional hydrophilic contact lenses.

With the container 12 unsealed, the liquid medium 16 and the contact lens 14, directly from the contact lens mold, are placed therein. The seal 18 is placed over, and secured to the top of container 12, thereby sealing the compartment 20 containing the contact lens 14 in contact with the liquid medium 16.

The contact lens 14 can be used by opening seal 18 (as shown by the shadow lines in FIG. 1), removing lens 14 from compartment 20 and placing the lens into one's eye. The container 12, liquid medium 16 and seal 18 can then be properly disposed of.

The following non-limiting examples illustrate certain aspects of the present invention:

EXAMPLE 1

A one day disposable, hydrogel-containing contact lens is wet cast molded in a polypropylene mold as follows. A monomer mixture of 98% by weight of 2-hydroxyethyl methacrylate, 1.6% by weight methacrylic acid and 0.4% by weight of ethylene glycol dimethacrylate is formed together with an effective amount of a conventional thermal initiator. This monomer is diluted by 20% by weight with water soluble polyethylene glycol having a molecular weight of about 1000. The diluted solution is added to a polypropylene contact lens mold and is cured using thermal curing. If desired, an ultraviolet light initiator can be included in place of the thermal initiator, and the solution can be cured using ultraviolet light curing. After curing, the lens is removed from the mold and placed in a packaging system similar to a conventional blister pack and hydrated with saline solution. The hydrated lens is formed to have mechanical properties similar to a dry cast molded lens.

EXAMPLE 1A

Alternately, and advantageously, the saline solution used in the package is altered to include about 20% of the polyethylene glycol, which is at substantial equilibrium with both the contact lens and the saline solution in the package. The use of this polyethylene glycol in the saline solution is effective to reduce, or even substantially eliminate, the polyethylene glycol from diffusing out of the contact lens during storage in the package.

EXAMPLE 2

A one day disposable, hydrogel-containing contact lens is wet cast molded in a polypropylene mold as follows. A monomer mixture of 98% by weight of 2-hydroxyethyl methacrylate, 1.6% by weight methacrylic acid and 0.4% by weight of ethylene glycol dimethacrylate is formed together with an effective amount of a conventional thermal initiator. This monomer is diluted by 30% by weight with water soluble polyethylene glycol having a molecular weight of about 1000. The diluted solution is added to a polypropylene contact lens mold and is cured using thermal curing. If desired, an ultraviolet light initiator can be included in place of the thermal initiator, and the solution can be cured using ultraviolet light curing. After curing, the lens is removed from the mold and placed in a packaging system similar to a conventional blister pack and hydrated with saline solution. The hydrated lens is formed to have mechanical properties similar to a dry cast molded lens.

EXAMPLE 2A

Alternately, and advantageously, the saline solution used in the package is altered to include about 30% of the polyethylene glycol, which is at substantial equilibrium with both the contact lens and the saline solution in the package. The use of this polyethylene glycol in the saline solution is effective to reduce, or even substantially eliminate, the polyethylene glycol from diffusing out of the contact lens during storage in the package.

EXAMPLE 3

A one day disposable hydrogel-containing contact lens is wet cast molded in a polypropylene mold as follows. A monomer mixture of 98% by weight of 2-hydroxyethyl methacrylate, 1.6% by weight methacrylic acid and 0.4% by weight of ethylene glycol dimethacrylate is formed together with an effective amount of a conventional thermal initiator. This monomer is diluted by 40% by weight with water soluble polyethylene glycol having a molecular weight of about 1000. The diluted solution is added to a polypropylene contact lens mold and is cured using thermal curing. If desired, an ultraviolet light initiator can be included in place of the thermal initiator, and the solution can be cured using ultraviolet light curing. After curing, the lens is removed from the mold and placed in a packaging system similar to a conventional blister pack and hydrated with saline solution. The hydrated lens is formed to have mechanical properties similar to a dry cast molded lens.

EXAMPLE 3A

Alternately, and advantageously, the saline solution used in the package is altered to include about 40% of the polyethylene glycol, which is at substantial equilibrium with both the contact lens and the saline solution in the package. The use of this polyethylene glycol in the saline solution is effective to reduce, or even substantially eliminate, the polyethylene glycol from diffusing out of the contact lens during storage in the package.

EXAMPLE 4

A one day disposable hydrogel-containing contact lens is wet cast molded in a polypropylene mold as follows. A monomer mixture of 98% by weight of 2-hydroxyethyl methacrylate, 1.6% by weight methacrylic acid and 0.4% by weight of ethylene glycol dimethacrylate is formed together with an effective amount of a conventional thermal initiator. This monomer is diluted by 50% by weight with water soluble polyethylene glycol having a molecular weight of about 1000. The diluted solution is added to a polypropylene contact lens mold and is cured using thermal curing. If desired, an ultraviolet light initiator can be included in place of the thermal initiator, and the solution can be cured using ultraviolet light curing. After curing, the lens is removed from the mold and placed in a packaging system similar to a conventional blister pack and hydrated with saline solution. The hydrated lens is formed to have mechanical properties similar to a dry cast molded lens.

EXAMPLE 4A

Alternately, and advantageously, the saline solution used in the package is altered to include about 50% of the polyethylene glycol, which is at substantial equilibrium with both the contact lens and the saline solution in the package. The use of this polyethylene glycol in the saline solution is effective to reduce, or even substantially eliminate, the polyethylene glycol from diffusing out of the contact lens during storage in the package.

EXAMPLE 5

A one day disposable hydrogel-containing contact lens is wet cast molded in a polypropylene mold as follows. A mixture of 48.8% by weight of 2-hydroxyethyl methacrylate, 0.5% by weight methacrylic acid, 0.7% by weight of a cross-linking component sold under the tradename Craynor 435 and 50% by weight of methyl terminated polyethylene glycol having a molecular weight of about 350 (PEGME-350) is formed together with an effective amount of a conventional thermal initiator. This mixture is added to a polypropylene contact lens mold and is cured using thermal curing. If desired, an ultraviolet light initiator can be included in place of the thermal initiator, and the mixture can be cured using ultraviolet light curing. After curing, the lens is removed from the mold and placed in a packaging system similar to a conventional blister pack and hydrated with saline solution. The hydrated lens is formed to have mechanical properties similar to a dry cast molded lens.

EXAMPLE 5A

Alternately, and advantageously, the saline solution used in the package is altered to include about 50% of the PEGME-350, which is at substantial equilibrium with both the contact lens and the saline solution in the package. The use of this methyl terminated polyethylene glycol in the saline solution is effective to reduce, or even substantially eliminate, the methyl terminated polyethylene glycol from diffusing out of the contact lens during storage in the package.

EXAMPLE 6

A one day disposable hydrogel-containing contact lens is wet cast molded in a polypropylene mold as follows. A mixture of 37.3% by weight of 2-hydroxyethyl methacrylate, 0.6% by weight methacrylic acid, 0.2% by weight of ethylene glycol dimethacrylate, 30.8% by weight of polyethylene glycol having a molecular weight of about 300 and 31.1% by weight of deionized water is formed together with an effective amount of a conventional thermal initiator. The mixture is added to a polypropylene contact lens mold and is cured using thermal curing. If desired, an ultraviolet light initiator can be included in place of the thermal initiator, and the mixture can be cured using ultraviolet light curing. After curing, the lens is removed from the mold and placed in a packaging system similar to a conventional blister pack and hydrated with saline solution. The hydrated lens is formed to have mechanical properties similar to a dry cast molded lens.

EXAMPLE 6A

Alternately, and advantageously, the saline solution used in the package is altered to include about 30.8% of the polyethylene glycol, which is at substantial equilibrium with both the contact lens and the saline solution in the package. The use of this polyethylene glycol in the saline solution is effective to reduce, or even substantially eliminate, the polyethylene glycol from diffusing out of the contact lens during storage in the package.

EXAMPLE 7 TO 18

Each of twelve (12) patients removes a different one of the lenses produced in accordance with Examples 1 to 6 and 1A to 6A from the solution and places it on his/her eye. In each case, while the lens is on the patient's eye, the polyethylene glycol or methyl terminated polyethylene glycol diffuses out of the lens and into the eye, thereby advantageously increasing the lubrication of the cornea and the eyelid of the eye.

If the patient was to remove the lens, place it into a saline solution and wear it again the next day, the lens would be significantly less comfortable to wear due to the loss of the polyethylene glycol, or methyl terminated polyethylene glycol and the loss of lubrication. In addition, because of the loss of the polyethylene glycol, or methyl terminated polyethylene glycol, the lens has less modulus or strength and appears more "floppy" after the lens is worn in the eye. In effect, the loss of the polyethylene glycol, or methyl terminated polyethylene glycol from the contact lens creates a trigger mechanism and/or provides an indication to the patient to be compliant with the one day disposable modality.

While this invention has been described with respect to various specific examples and embodiments, it is to be understood that the invention is not limited thereto and that it can be variously practiced within the scope of the following claims.

What is claimed is:

1. contact lens package, comprising:
   a cavity;
   a contact lens disposed in the cavity, the contact lens comprising a reaction product of a polymerizable composition comprising an amount of a water soluble polymer, at least one hydrophilic monomer, and at least one crosslinking monomer reactive with the at least one hydrophilic monomer;
   a packaging liquid disposed in the cavity and in contact with the contact lens, the packaging liquid including an additional amount of the water soluble polymer;
   wherein the water soluble polymer is a polyalkyelene glycol; and
   a seal surrounding the cavity to maintain the contact lens in a sterile environment.

2. The package of claim 1, wherein the contact lens is a cast molded contact lens.

3. The package of claim 1, wherein the contact lens is a hydrogel-containing contact lens.

4. The package of claim 1, wherein the contact lens includes a hydrophilic polymeric material and the water soluble polymer is present in the contact lens in an amount of about 1% to about 50% by weight of the hydrophilic polymeric material.

5. The package of claim 1, wherein the contact lens includes a hydrophilic polymeric material and the water soluble polymer is present in the contact lens in an amount of about 10% to about 30% by weight of the hydrophilic polymeric material.

6. The package of claim 1, wherein the polyalkylene glycol is polyethylene glycol.

7. The package of claim 1, wherein the contact lens comprises at least two water soluble polymers.

8. The package of claim 1, wherein the liquid is a material selected from the group consisting of an aqueous liquid, a saline solution, and a buffered saline solution.

9. The package of claim 1, wherein the package is sterilized.

10. The package of claim 1, wherein the contact lens is a single use contact lens.

11. The package of claim 1, wherein the at least one hydrophilic monomer is selected from the group consisting of hydroxalkyl acrylates, hydroxyalkyl methacrylates, N-vinyl pyrrolidone, acrylamides, vinyl alcohol, hydrophilic polyurethane precursors, glycerol acrylates, glycerol methacrylates, acrylates, methacrylates, and mixtures thereof.

* * * * *

UNITED STATES PATENT AND TRADEMARK OFFICE
CERTIFICATE OF CORRECTION

| | | |
|---|---|---|
| PATENT NO. | : 7,816,455 B2 | |
| APPLICATION NO. | : 11/669353 | |
| DATED | : October 19, 2010 | |
| INVENTOR(S) | : J. Christopher Marmo | |

It is certified that error appears in the above-identified patent and that said Letters Patent is hereby corrected as shown below:

In column 5, line 17, after "result." insert -- Such amounts may be in a range of about 1% or about 5% or about 10% or about 15% to about 20% or about 30% or about 40% or about 50% or more of the hydrophilic polymeric material present in the contact lens. --.

In column 11, line 16, in claim 1, before "contact" insert -- A --.

In column 11, line 27, in claim 1, delete "polyalkyelene" and insert -- polyalkylene --, therefor.

In column 12, line 27, in claim 11, delete "hydroxalkyl" and insert -- hydroxyalkyl --, therefor.

Signed and Sealed this
Eighth Day of February, 2011

David J. Kappos
*Director of the United States Patent and Trademark Office*